(12) United States Patent
Betawar et al.

(10) Patent No.: US 6,665,575 B2
(45) Date of Patent: Dec. 16, 2003

(54) RECIPE EDITOR FOR EDITING AND CREATING PROCESS RECIPES WITH PARAMETER-LEVEL SECURITY FOR VARIOUS KINDS OF SEMICONDUCTOR-MANUFACTURING EQUIPMENT

(75) Inventors: Manoj Betawar, Fremont, CA (US); Vrunda Bhagwat, Santa Clara, CA (US); Dinesh Goradia, Fremont, CA (US); Manish Mehta, Santa Clara, CA (US); Nitin Parekh, Milpitas, CA (US)

(73) Assignee: FabCentric, Inc., Sunnyvale, CA (US)

( * ) Notice: Subject to any disclaimer, the term of this patent is extended or adjusted under 35 U.S.C. 154(b) by 0 days.

(21) Appl. No.: 09/683,569

(22) Filed: Jan. 18, 2002

(65) Prior Publication Data

US 2002/0055804 A1 May 9, 2002

Related U.S. Application Data

(62) Division of application No. 09/350,039, filed on Jul. 8, 1999, now Pat. No. 6,415,593.

(51) Int. Cl.[7] .............................. G06F 19/00; G06F 9/44
(52) U.S. Cl. ...................... 700/121; 700/87; 713/200; 717/170
(58) Field of Search .............................. 700/86, 87, 90, 700/105, 117, 121, 181; 713/182, 187, 200; 717/168–170

(56) References Cited

U.S. PATENT DOCUMENTS

| | | | | | |
|---|---|---|---|---|---|
| 5,261,102 | A | * | 11/1993 | Hoffman | 713/200 |
| 5,740,053 | A | * | 4/1998 | Iwama | 700/121 |
| 6,097,887 | A | * | 8/2000 | Hardikar et al. | 717/105 |
| 6,141,754 | A | * | 10/2000 | Choy | 713/200 |
| 6,168,672 | B1 | * | 1/2001 | Nguyen | 134/18 |
| 6,269,279 | B1 | * | 7/2001 | Todate et al. | 700/121 |
| 6,442,446 | B1 | * | 8/2002 | Nakamura et al. | 700/121 |

OTHER PUBLICATIONS

Stamper, David A., Local Area Networks, 1997, Addison Wesley, Second Edition, pp. 143–144.*

* cited by examiner

Primary Examiner—Leo Picard
Assistant Examiner—Paul Rodriguez
(74) Attorney, Agent, or Firm—Sierra Patent Group, Ltd.

(57) ABSTRACT

A universal recipe editor for editing of semiconductor-manufacturing recipes. The universal recipe editor can read recipes from a wide variety of semiconductor-manufacturing machines from different manufacturers using recipe distributed object model (R-DOM) files. An R-DOM file is generated for each kind of recipe-file format to locate process parameters within proprietary recipe-file formats. The sequence of parameters in the R-DOM file matches the sequence in the recipe data file so that parameter may be mapped from recipe data files for display and editing. ASCII or binary recipe file formats are mapped from the recipe data file using R-DOM objects. Revision and authorng information is kept in a recipe information file for each recipe.

3 Claims, 9 Drawing Sheets

RECIPE HEADER

| RECIPE NAME | CREATED BY | CREATE DATE | EDITED BY | EDIT DATE |
|---|---|---|---|---|
| NEOSPTR M3B | JOE ENGINEER | 1/8/99 | JIM MGR | 2/6/99 |

PARAMETER / VALUE

| PARAMETERS | STEP 1 | STEP 2 | STEP 3 | STEP 4 | STEP 5 | STEP 6 | STEP 7 |
|---|---|---|---|---|---|---|---|
| PROCESS TIME | 55 | 65 | 60 | 60 | 90 | 200 | 70 |
| PROCESS TEMP | 15 | 25 | 40 | 65 | 105 | 70 | 45 |
| VACUUM VALVE | ON | ON | ON | ON | OFF | ON | OFF |
| CHILLER TEMP | 80 | 45 | 20 | 8 | 25 | 45 | 0 |
| LIQUID 1 FLOW RATE | 1.5 | 1.8 | 2.3 | 3.1 | 2.5 | 1.6 | 0.9 |
| TARGET/BEAM RECIPE | MGR/R1 | MGR/R2 | MGR/R2 | MGR/R2 | MGR/R7 | MGR/R0 | MGR/R9 |

FIG. 9

RECIPE EDITOR FOR EDITING AND CREATING PROCESS RECIPES WITH PARAMETER-LEVEL SECURITY FOR VARIOUS KINDS OF SEMICONDUCTOR-MANUFACTURING EQUIPMENT

CROSS REFERENCE TO RELATED APPLICATION

This patent is a divisional of U.S Ser. No. 09/350,039, filed Jul. 8, 1999, now U.S. Pat. No. 6,415,593.

BACKGROUND OF INVENTION

This invention relates to software editors, and more particularly to systems for editing semiconductor-process recipes from different semiconductor-processing machines.

Advances in semiconductor manufacturing are the driving force behind increases in productivity in almost all areas of today's economy. Powerful computers and networks rely on inexpensive semiconductor integrated circuits or chips. Semiconductors are mass produced as batches of silicon wafers. The batches of wafers move through various steps of a semiconductor fabrication plant or "fab". Each wafer may contain hundreds of thousands of individual chips.

A batch of wafers is produced by a sequence of various processing steps. Furnaces are used to grow silicon-dioxide (oxide) layers on the silicon surface of the wafers. Steppers and other photolithgraphy machines expose a layer or photo-resist on the wafer surface, while chemical baths wash away either the exposed or un-exposed photo-resist to form circuit and device patterns on the wafer. Chemical-vapor-deposition (CVD) machines and metal-vapor deposition machines deposit thin yet uniform layers on the wafer. Ion implanters drive high-energy beams of ions into the wafer, forming doped regions. Wafers processed in a fab also undergo various tests and measurements for durability, defects, and conformance with original design and process requirements. Various wafer inspection, metrology, test, and measurements tools are used.

Each of these semiconductor-processing, inspection, metrology, and measurement machines requires a set of operating instructions (a processing program) or a recipe. Recipes vary of each kind of machine, and even among different machine manufacturers for the same kind of machine. For example, and etch system manufactured by Applied Materials of Santa Clara, Calif. may require a 10-minute reaction time with a certain flow of gases, while the reaction chamber is kept at a certain elevated temperature. At the end of the 10-minute reaction time, the flow of reactive gasses are gradually reduced and replaced with inert gasses as the temperature is lowered. Another etch system manufactured by Lam Research of Fremont, Calif. may require a 15-minute reaction time in reaction chamber, with different mixture of gasses and a different temperature.

Other kinds of semiconductor-processing equipment require vastly different recipes. A furnace recipe may specify how rapidly a tray of wafers is pushed into the furnace tube while inert gas is pumped through the furnace. Then the temperature is raised to a first target. Next a reactive gas such as oxygen or silane is pumped through the furnace tube to form an oxide or poly-silicon layer. Finally some nitrogen or nitrogen-oxide may be introduced to form a capping layer of a nitride over the oxide or polysilicon. Then after a specified time, inert gas is pumped through the furnace as it cools down to a second target temperature over a specified time interval. Finally the tray of wafers are pulled out of the furnace tube at a specified rate and allowed to cool before being moved to the next process machine.

These recipes can become quite complex and varied as process engineers attempt to tweak the process for desired electrical and manufacturing-yield results. Different semiconductor products may require different recipes or combinations of steps. A dynamic-RAM process may require lighter ion-implant doses than a process for logic chips. Different oxide thicknesses require different reaction times in the furnaces.

Wide Variety of Semiconductor-Process Equipment FIG. 1

FIG. 1 illustrates some of the semiconductor-process equipment in a wafer-fab clean room. Semiconductor-manufacturing equipment 10 includes low-pressure and plasma reaction chambers, lithography equipment, ion implanters, wafer wash stations, and furnaces, among others. Each piece of equipment 10 typically includes an embedded computer or controller for operating the equipment. The embedded computer controls reaction times, gas flow rates, temperatures, ion-implant doses and energy, and perhaps robotic movement of wafers through the equipment's reaction chambers. A video display may be included to alert equipment operators when steps have completed, and keyboards allow the operators to select recipes for use with a current batch of wafers. Bar-code readers may also be used as an input device, reading a bar code on each box of wafers.

Each of the different pieces of semiconductor-manufacturing equipment 10 has a different user interface, requiring special training for the operators and process engineers. Few, if any engineers, can operate all equipment in a fab, requiring that process engineers specialize in one or a few types of semiconductor-manufacturing equipment. Some machines may provide recipe-editing and display features, allowing a process engineer to view and edit a recipe, and manage many different recipes on the embedded computer's storage. However, the lack of a standard user interface among the different machines limits an engineer to editing recipes on just a few of the many machines.

Other kinds of factories have established file standards. See U.S. Pat. Nos. 5,828,851 and 5,838,563. Unfortunately, the extremely competitive environment for semiconductor-manufacturing equipment has prevented adoption of such standards. Instead, separate workstation computers are often used in the fab in conjunction with each process station. See U.S. Pat. Nos. 5,432,702 and 5,105,362.

While such recipe editing is useful, the editing feature of semiconductor-manufacturing equipment has been called the world's most expensive word processor. Semiconductor-manufacturing equipment can cost as much as a million dollars per machine. Use of the editing features may prevent the semiconductor-manufacturing equipment from processing wafers. This down-time is quite expensive in terms of lost wafer revenue and depreciation of the equipment. Thus is it very undesirable to edit recipes on the semiconductor-manufacturing equipment itself.

The semiconductor-manufacturing equipment is usually located inside a low-particle-density environment called a clean room. To maintain the low particle density, all persons are required to wear special clothing known as a "bunny suit". Gloves, masks, and even breathing filters are required in some clean rooms. Typing in a recipe while wearing gloves is cumbersome, and engineers sometimes may be tempted to remove the gloves, generating particles in the clean room.

Offline Editing on a PC FIG. 2

FIG. 2 shows transferring a recipe from a clean room to a personal computer (PC). Since editing a recipe on the semiconductor-manufacturing equipment (on line editing) is so expensive, recipes are often copied to a diskette and edited on a PC (off-line editing). Semiconductor-manufacturing equipment 10 is located in a clean-room fab and is almost continuously used for manufacturing operations. Little time on equipment 10 is available for use by the process engineer.

Semiconductor-manufacturing equipment 10 has a user interface, allowing recipes to be edited on the machine. An engineer could type in a recipe on keyboard 12 and view recipes on video display 14, but it is more convenient to copy recipes to a floppy diskette in floppy drive 16 on equipment 10. Diskette 18 can then be carried out of the clean-room fab and inserted into PC 20 at the engineer's office. The engineer can then edit the recipes and create new recipes, using a standard text editor or a proprietary recipe editor provided by the semiconductor-manufacturing equipment manufacturer.

These recipes can be printed on the office printer 22. The new recipes can be copied to diskette 18 and then carried into the clean-room fab. The new recipes on diskette 18 can then be copied to the embedded computer in semiconductor-manufacturing equipment 10 using floppy drive 16.

Different Machines Use Different Recipe Formats, Need Different Editors

Other semiconductor-manufacturing equipment 10' uses a different file format for recipes, and has different process parameters and conditions that must be set. While recipe editing could be done on semiconductor-manufacturing equipment 10' itself, this may require that wafer processing stop while the editing is performed. This down-time is extremely expensive and disruptive of other fab operations.

Instead, an engineer may copy the recipe from semiconductor-manufacturing equipment 10' to diskette 18' and carry the diskette to his office PC 20'. Since semiconductor-manufacturing equipment 10' is a different machine than semiconductor-manufacturing equipment 10, a different editor is used on PC 20' than on PC 20. Some manufacturers of semiconductor-manufacturing equipment 10' may supply an off-line recipe editor for use on PC 20', but this editor cannot edit recipes from other machines, such as from semiconductor-manufacturing equipment 10. There is no universal editor for different kinds of recipes from different semiconductor-manufacturing equipment.

Some clean-room fabs now connect semiconductor-manufacturing equipment 10, 10' to a network such as a local-area network (LAN). This allows the engineer at PC 20, 20' to copy recipe files directly from semiconductor-manufacturing equipment 10 using the LAN. Unfortunately, the problem of differing file formats for recipe files from different semiconductor-manufacturing equipment still remains. Often binary, proprietary file formats are used for different machines.

Some of these file formats do not include adequate documentation, such as full revision histories and fields for names of engineers making process changes. Security is also important, since operators should not be able to change recipes. Even engineers in other groups should not be authorized to make recipe changes. Some recipe changes may require approval of the engineering or fab-production supervisor while other changes may be allowed. Critical parameters such as temperature should require a higher security level than less-important parameters such as furnace-tray push/pull times and wafer-handling time between two process chambers. Parameter-level security is desired in addition to security for the overall recipe.

What is desired is an off-line recipe editor for use in an office outside of the clean-room fab. It is desired to edit recipes from many kinds of different semiconductor-manufacturing equipment machines, including recipes for different kinds and makes of machines. It is desired to edit recipe files having a variety of proprietary formats using a single recipe editor. It is desired to make changes to process conditions such as temperature, reactants, gas flows and pressures, reactions and delay times, and plasma or ion-beam energies. A universal or unified recipe editor for semiconductor-manufacturing equipment is desired.

SUMMARY OF INVENTION

A universal semiconductor-recipe editing system has a recipe data object model (R-DOM) object that is coupled to read and write recipe data files. Each recipe data file controls a process performed on a wafer by a semiconductor-manufacturing machine. The R-DOM object includes a means for reading recipe data files for a variety of semiconductor-manufacturing machines from different vendors that require different native formats of the recipe data files. The R-DOM object locates and reads a desired parameter within a recipe data files.

A visual recipes editor is coupled to the R-DOM object. It displays parameters from the recipe data file to a user. The R-DOM object sends the desired parameter to the visual recipe editor for display to the user.

An R-DOM file is accessed by the R-DOM object. It identifies locations of parameters in the recipe data files. The R-DOM file contains a sequence of parameters. The sequence of parameters is in a same order as a native sequence of parameters in the recipe data file.

The R-DOM object reads the R-DOM file to determine a location of the desired parameter in the recipe data file. The R-DOM object reads the desired parameter at the location in the recipe data file and sends the desired parameter to the visual recipe editor for display to the user. Thus the R-DOM object uses the R-DOM file to locate the desired parameter in the recipe data files.

In further aspects of the invention each type and vendor of semiconductor-manufacturing machine has a different native sequence of parameters in a recipe data file. This requires a different R-DOM file with a different sequence of parameters to map parameter locations in the recipe data file for each type and vendor of semiconductor-manufacturing machine. Thus different R-DOM files are used for different semiconductor-manufacturing machines. The machines have different native sequences of parameters in the recipe data files.

In still further aspects the recipe data files includes ASCII formats and binary formats. The ASCII formats include comma-separated-value formats in which records in recipe data file are delimited by commas. The R-DOM object counts commas in the recipe data file to locate the desired parameter. The binary formats include fixed-record-length formats where each parameter occupies one or more fixed-length records. The R-DOM object counts records to located the desired parameter in the recipe data file. Thus the R-DOM object locates the desired parameter in recipe data files with binary formats or ASCII formats.

In further aspects, the R-DOM file contains limits for a parameter. The limits indicate maximum and minimum values for a parameter in the recipe data file. However, the recipe data file does not contain the limits but only the parameter's value. The R-DOM object further includes a validation means that compares a new value of the desired parameter to the limits and prevents the parameter from being updated to the new value when the new value falls outside the limits. Thus limits checking is performed using the R-DOM file.

BRIEF DESCRIPTION OF DRAWINGS

FIG. 9 is a display screen that shows parameters from a recipe file using a spreadsheet interface.

DETAILED DESCRIPTION

The present invention relates to an improvement in semiconductor-process recipe editing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Terminology

The following abbreviations are frequently used in the description:

Recipe-data object model (R-DOM)

Visual Recipe Editor (VRE)

Recipe Template File (.RTL)

Recipe Information File (.VRC)

R-DOM is an object. An R-DOM file allows R-DOM to be a persistent object. Even when VRE is shut down and the instance of the R-DOM object is finished, the R-DOM file still exists. The next time a user opens a recipe in VRE the R-DOM object will be created based on the data in the R-DOM file. The R-DOM file contains the parameter names and arrangement that is unique to each recipe. The actual parameter values are kept in a recipe data file.

The inventors have realized that a unified recipe editor can be constructed for off-line recipe viewing and editing. The unified recipe editor can read recipes from a variety of semiconductor-manufacturing equipment machines using recipe data-object-model (R-DOM) files. An R-DOM file can be generated for each kind of recipe file format to locate process parameters within proprietary recipe-file formats. Thus recipes can be read into the unified recipe editor from many different semiconductor-manufacturing machines.

The inventors have further realized that revision and author information can be kept in the recipe information file (.VRC) for each recipe. Additionally, each line of the R-DOM file can specify a different process parameter. Security or access rights for each parameter can then be added for each parameter by including security codes on each line in the R-DOM file. A security system can then be queried before each parameter is edited to determine if the user has sufficient privilege to edit that parameter. Thus parameter-level security is provided for process recipes for a variety of semiconductor equipment. R-DOM files can contain other information not provided for by the native recipe format, such as parameter-level functions and limits.

Figure 1:
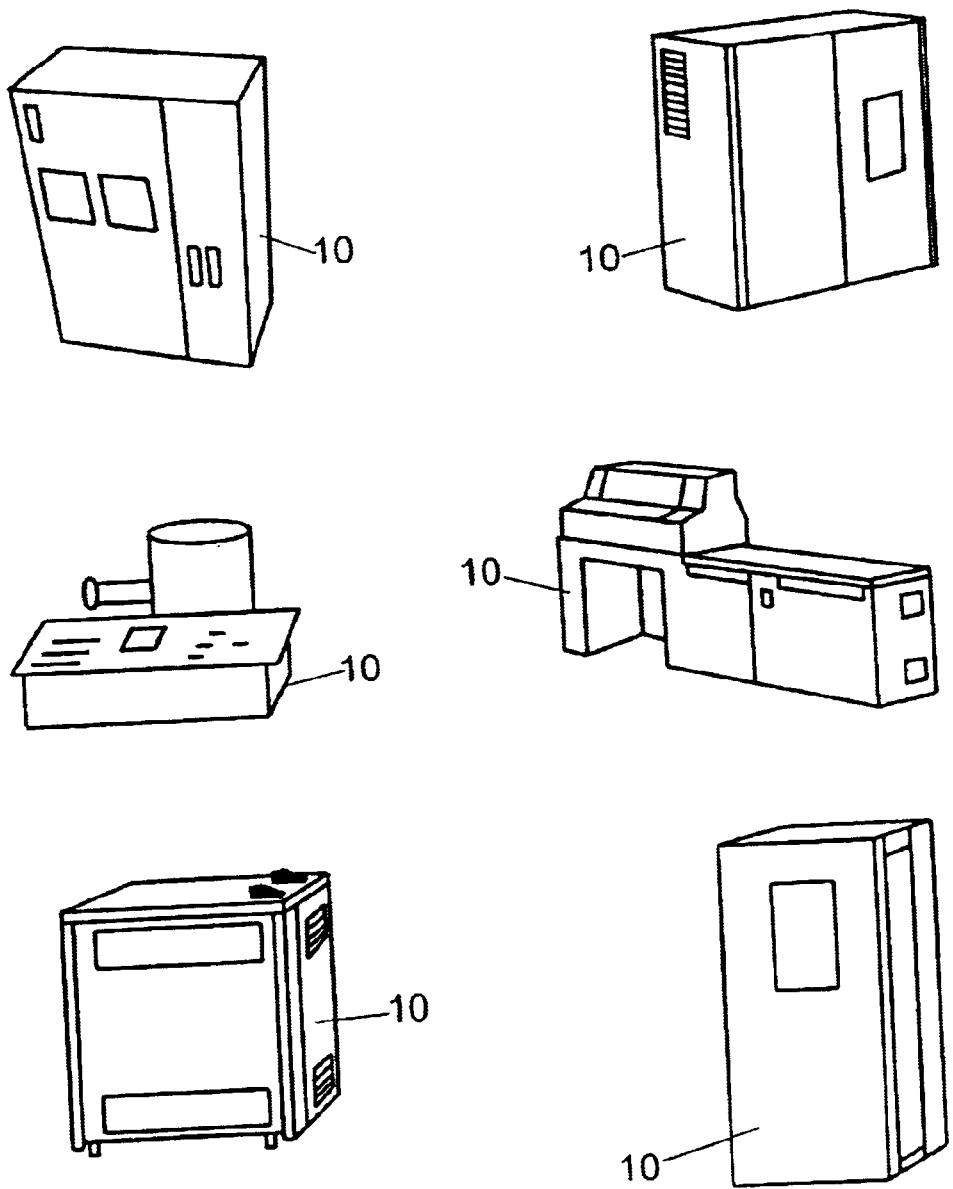
FIG. 1 illustrates some of the semiconductor-process equipment in a wafer-fab clean room.
Figure 2:
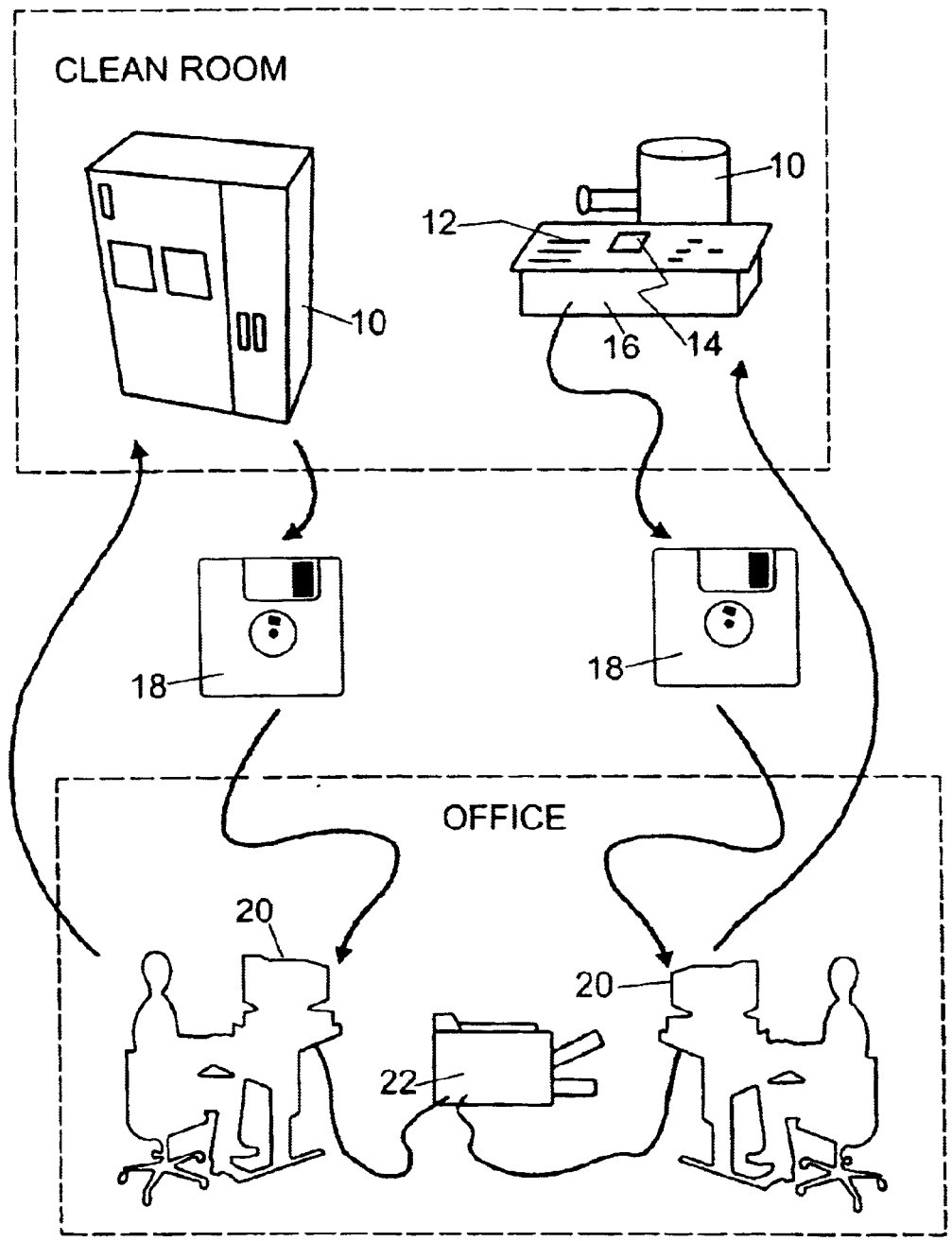
FIG. 2 shows transferring a recipe from a clean room to a personal computer (PC).
Figure 3:
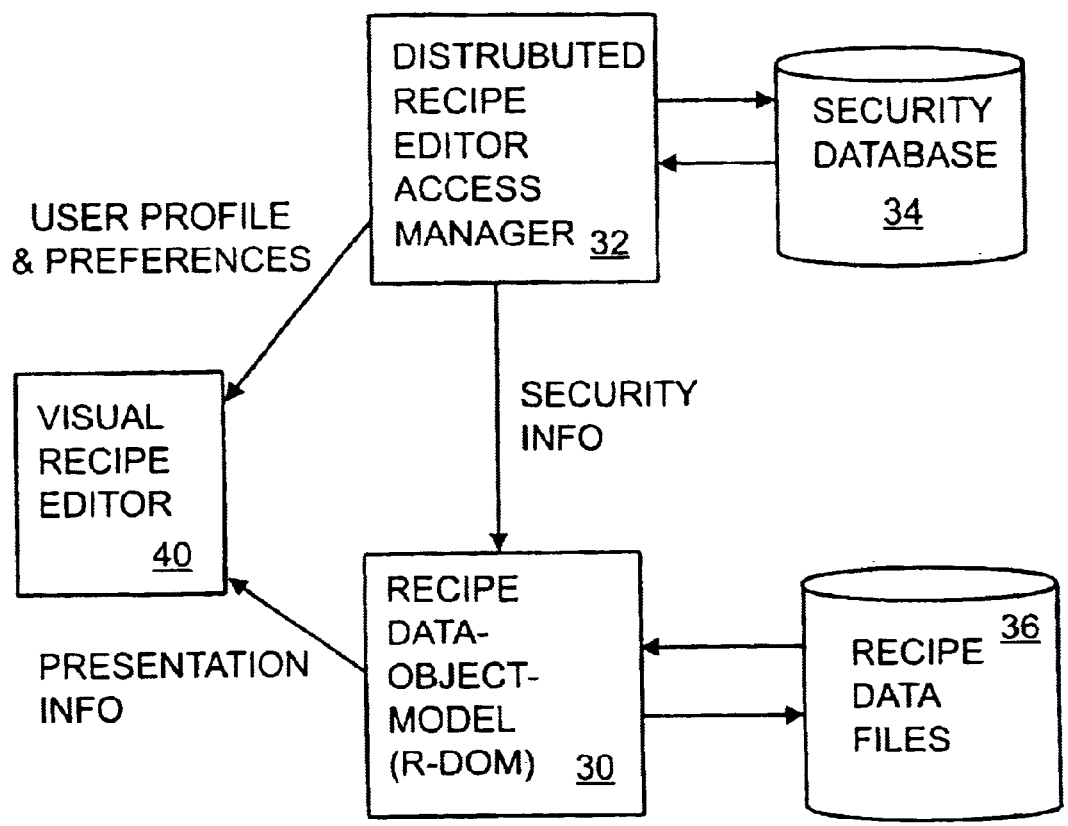
FIG. 3 is an overall diagram of a universal recipe editor.

Universal Recipe Editing System FIG. 3

FIG. 3 is an overall diagram of a universal recipe editing system. Recipes from a wide variety of semiconductor-manufacturing equipment or tools from different vendors are located in recipe storage 36. Recipe storage 36 may be a local hard disk, or may include access to a distributed file system such as a local-area network (LAN). In the case of a LAN, the recipes can be located on many different semiconductor-manufacturing machines that are connected to the LAN, as well as workstations in the fab and office computers such as PCs, Manufacturing Execution Systems (MES), Recipe Management Systems (RMS), and Enterprise Resource Planning systems.

Recipe storage 36 contains the recipe files in a wide variety of formats, usually proprietary, machine-specific formats including ASCII and binary. Recipe-data object model (R-DOM) 30 is used to construct maps into a recipe file that allow the recipe-editing system to locate various process and equipment parameters within the recipe file for reading and writing. A different R-DOM file is used for each different format of recipe files, but several recipes that share the same format may use the same R-DOM file. Often many recipes are used for the same semiconductor-manufacturing machine and these have the same recipe format and use the same R-DOM file.

An R-DOM object is constructed using an R-DOM file. An instance of an R-DOM object is created by visual recipe editor (VRE) 40 to access data from the recipe data file. R-DOM 30 provides the mapping of the parameters with the corresponding bytes in the recipe data file. When the user changes a parameter, visual recipe editor 40 writes the new parameter value to the memory buffer, which is changed in the recipe data file when the user chooses to save.

R-DOM objects perform functions such as validation. Validation of parameters is performed to check that updated parameters still fall within limits, such as maximum and minimum temperatures or flow rates. Complex dependencies among several parameters may also be checked during validation, such as when a throttle wall is on in the first step, then it will be on in the second and third steps. Otherwise, if the throttle wall is off in the first step then it will be off in the second and third steps. User-defined functions can be executed to check these various dependencies during validation.

When the user begins a session with visual recipe editor 40, user information is collected and verified with the security system 32, which access security information 34. Then visual recipe editor 40 is started based on the user profile and preferences. Multiple sessions of visual recipe editor 40 can be active simultaneously on different office PC's and workstations. However, at any given time only one user can edit a recipe file.

A user may be allowed to access some recipe files but not others. A diffusion process engineer might be allowed to access recipe files for diffusion furnaces but not recipes for etchers or photolithography machines. Read or write privileges may also be verified, allowing a process-integration engineer or a product engineer to read and review recipes but not edit the recipes.

Even within a single recipe, some parameters may be more critical than others. Only a few engineers or engineering supervisors may be allowed to edit these critical parameters while lower-level line engineers may edit other non-critical parameters. When a user tries to update a parameter using visual recipe editor 40, VRE 40 queries security system 32 for each parameter update. When security system 32 determines that the user does not have sufficient privilege to edit a parameter, VRE 40 prevents the parameter update. Thus a user of visual recipe editor 40 may be allowed to update some parameters but not others in a recipe file.

When the Recipe Editor session on VRE 40 starts, the look and feel of VRE 40 is determined by the user profiles and preferences. Preferences may include display arrangements and screen attributes. A user of a workstation within the clean room may specify a profile that uses pop-up keypads on the screen so that data can be input using a touch-screen display, while an office user can use a standard keyboard and not display the pop-up keypads.

Figure 4:
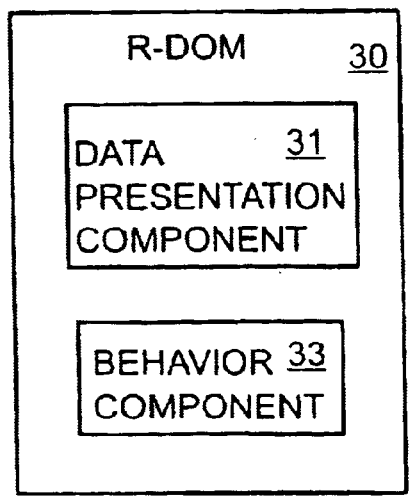
FIG. 4 shows the recipe data object model (R-DOM) used by the visual recipe editor.

Recipe Data-Object Model FIG. 4

FIG. 4 shows the Recipe Data Object Model. The concept of an object allows for the definition of a new data type according to the needs of the problem to be solved. Objects can contain two different types of information: data and functions. R-DOM 30 contains two parts: Data Presentation Component 31 represents the data and information about the process parameters (52 of FIG.5) and Behavior Component 33 represents standard functions and custom functions (56 of FIG.5).

R-DOM 30 is a persistent data object. A persistent data object is saved in non-volatile data-storage memory so that when the application shuts down, the objects continue to exist in a comma-separated value (CVS), Extensible-Markup Language (XML), or database file format. The R-DOM file contains the standard and custom functions used to created and operate R-DOM 30. For example, to create an R-DOM 30, the recipe editor calls the ParameterList() function within R-DOM 30.

While the visual recipe editor is a universal interface in which the recipes are displayed in a standard way, it is the R-DOM file that is unique to each type of recipe for a machine. The R-DOM file provides the unique structure for each recipe. For example, for a drying recipe the R-DOM file will contain the parameters for heat, duration of heat, and pressure level. The actual values for these parameters are in the associated recipe data file.

Figure 5:
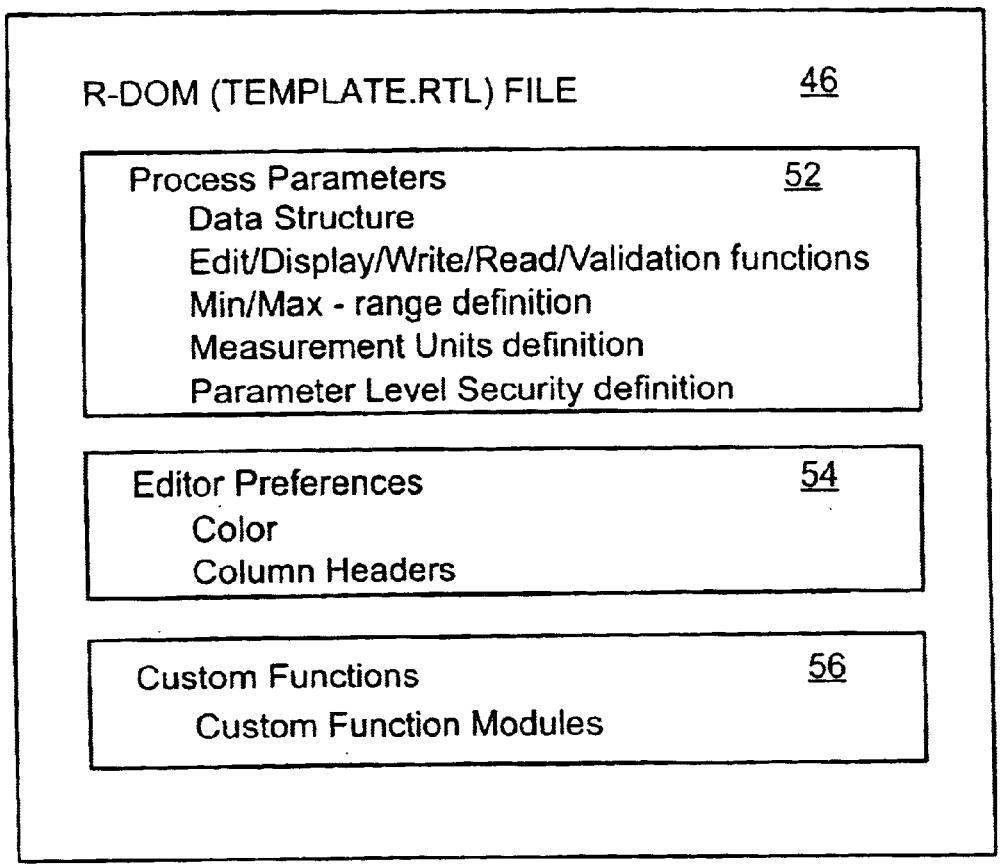
FIG. 5 shows the structure and contents of a R-DOM file.

R-DOM File FIG. 5

FIG. 5 shows the structure and contents of R-DOM file 46. R-DOM files 46 are used by the R-DOM object and the visual recipe editor as a map into the recipe data file to find a desired parameter value. R-DOM files 46 also contain additional information not found in the recipe data file, such as parameter limits and security levels. A different R-DOM file 46 is needed for each different kind of semiconductor-manufacturing equipment for each vendor, since most use different formats for recipe files. R-DOM files 46 are constructed manually using R-visual template builder software tool.

R-DOM file 46 contains three sections: process parameters 52, editor preferences 54, and custom functions 56. For example an R-DOM file in CSV format defines a process parameter 52 in each line, with comma-delimited fields. The fields on a line for a parameter specify the data structure or location within the recipe data file where that parameter can be found, and the name and type of parameter. The minimum and maximum values for the parameter are also included in fields on the line, as are the units of measurement for the parameter (seconds, degrees centigrade, cubic-centiliters/sec, millitorr, etc.).

Names of functions to read and write parameter values from the recipe data file are also included on the line, as are function names to display, edit, and validate values. Parameter-level security is provided by specifying a security function for that process parameterEditor preferences 54 include display colors and column headers (text). Custom functions 56 allow the user to write special functions that operate on the parameters. Custom functions can include drop-down lists of possible parameter values for use when updating parameters, or special warning messages when someone attempts to edit the more critical parameters. Multi-parameter validation routines can also be included.

Often each line in a CSV R-DOM file is for one parameter. A typical line in a R-DOM file is shown below:

0021, TIME1, L, 1>1:33554432, 8, 1, 1, 100, Seconds, E_Function, D_Function, W_Function, R_Function, V_Function, Eclipse Main, Security Group E1

The first field on the line is the parameter number, a unique identifier for the parameter, 0021. The parameter number indicates that this parameter is found in the recipe file before any parameters numbered 0022 and above, but after parameters numbered 0001 to 0020. (All parameters are read even if they are not used or displayed.) When the parameters in the recipe file vary in record length, the record lengths of all previous parameters in the sequence must be summed to get an offset to the desired parameter. The data type field in the parameter's line in the R-DOM file specifies the record length for the parameter for variable record-length files, or the number of records used by the parameter for fixed record-length recipe files. Thus the location of any parameter in the recipe file may be generated from the parameter sequence list and record length of the parameter's data type.

The parameter name, in second field, is TIME1. The third field is the parameter type or location (System, Header, Equipment, or Line). TIME1 is a process parameter. A page number (1) and display location (1) and attribute (33554432) is in the fourth field. This is the screen location on the visual recipe editor that the parameter appears. The attribute field defines whether any of the custom functions are assigned for a parameter.

The data type is 8, which is a string S format. The data type specifies the record length or the number of fixed-length records needed for the parameter value in the recipe data file. The default (initial) value is 1, the minimum value is also 1, the maximum value is 100, and the units are seconds.

A series of function names follows, for edit, display, write, read, and validation functions for the parameter. These functions are called when a user edits/writes, displays/reads, and validates a parameter. Different read and write functions can be called for different parameters of recipe files. All the above functions can be called for the different parameters.

R-DOM files 46 specifies the location of parameters within the recipe file. The R-DOM file 46 can be in CVS format while the recipe data file is in XML or binary formats. The R-DOM file 46 contains the pointers to other R-DOM files creating nested recipes.

Figure 6A:
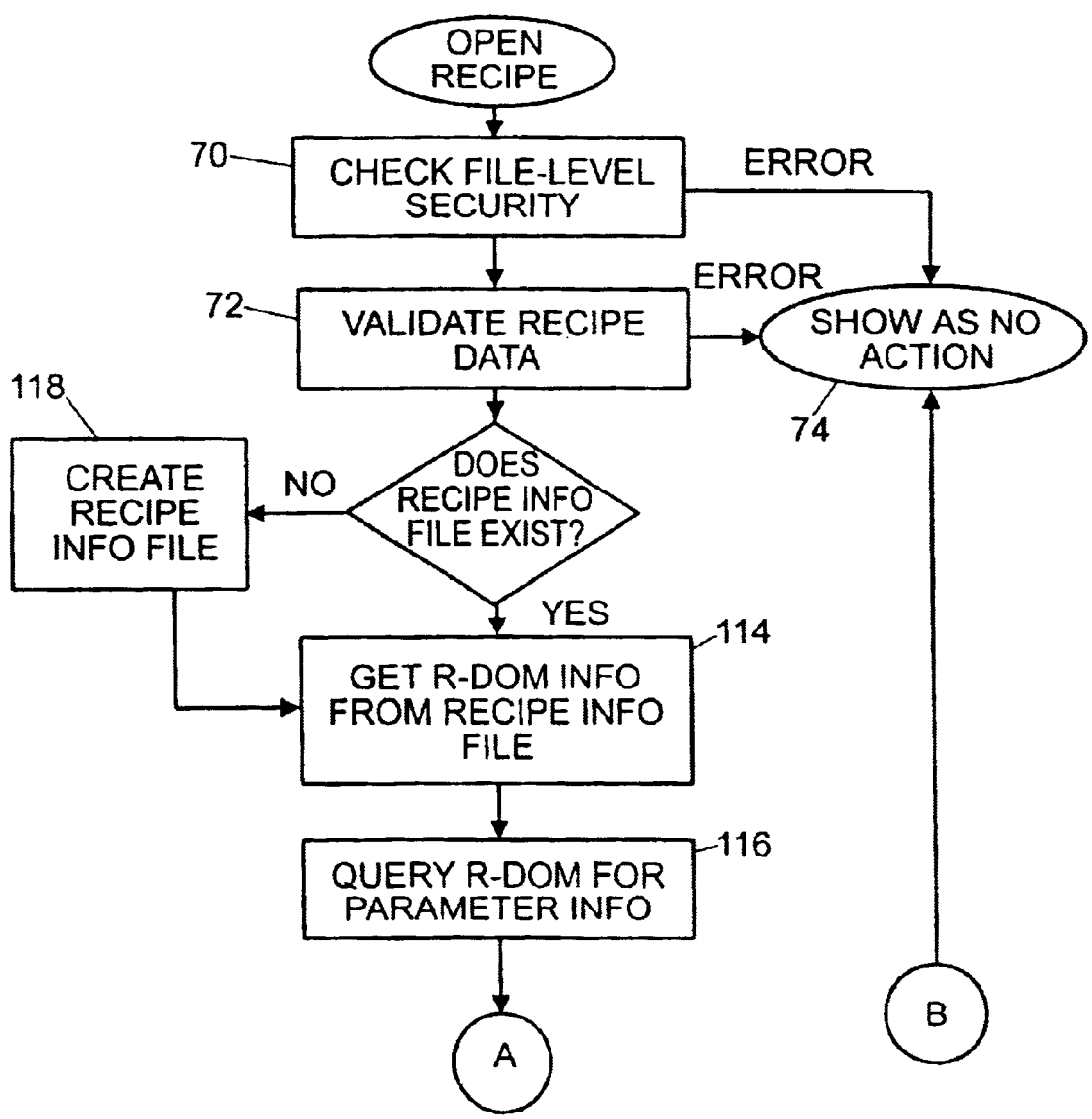
FIGS. 6A, 6B show a flowchart for reading parameters from a recipe file for display by the visual recipe editor.
Figure 6B:
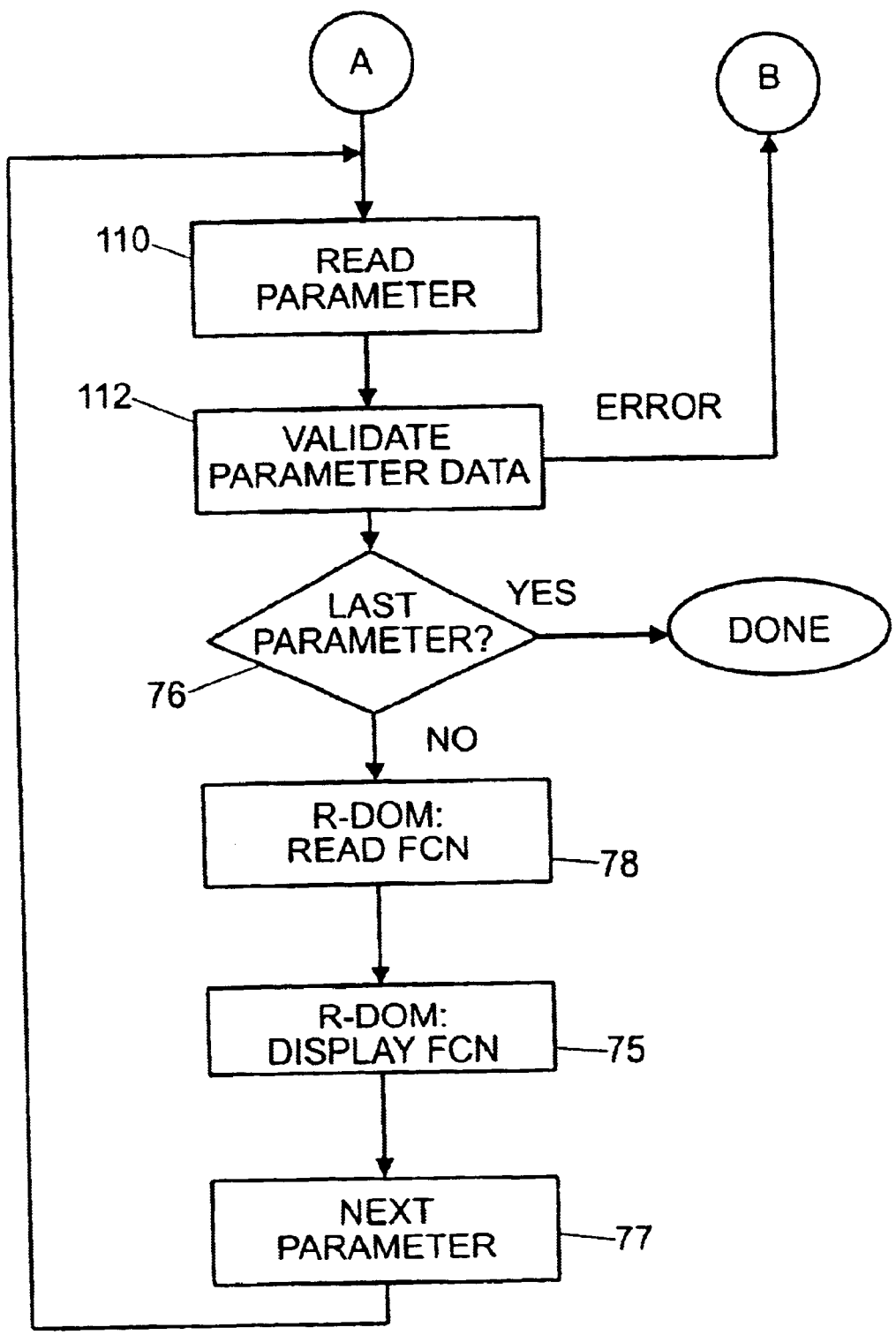

Displaying Parameters FIGS. 6A–B

FIGS. 6A–B show a flowchart for reading parameters from a recipe file for display by the visual recipe editor.

When a user of the visual recipe editor opens a recipe file, the visual recipe editor executes the procedure of FIGS. 6A–B. The file-level security is checked by VRE, step 70, querying the security system with the user name and password and the recipe file name. If the user does not have the correct security level (does not belong to the security group for the recipe file being opened), then an error occurs and no action is performed, step 74.

If the user belongs to the correct security group, the recipe file is verified, step 72. The data in the recipe file is verified one parameter at a time. The R-DOM file or object for this recipe file format is opened and used to read the recipe file. The R-DOM file specifies the format of the recipe file, and the sequence and length of parameter records in the recipe file.

If a recipe information file (VRC file) does not exist, a new recipe information file is created, step 118. This recipe information files is read to determine which R-DOM objects are needed by the visual recipe editor, step 114. The R-DOM file is queried for parameter information and locations, step 116. Recipe data files in the ASCII format can be read using different parsing methods as specified in the R-DOM objects. Binary recipe file formats usually have fixed file size. Parameters can be found in these files by treating them as streaming data.

Continuing in FIG. 6B, the visual recipe editor reads the parameters at the corresponding offset locations within the file as specified by R-DOM, step 110. The recipe file is then read one parameter at a time. One of the fields in each line in the R-DOM file specifies the name of a validation function (V_Function). The validation function for each parameter (line) is executed, step 112, to check the validity of the parameter value. The parameter value is compared to the miximum and minimum values listed for that parameter. When the parameter value falls outside the minimum or maximum values, the validation fails, and error is signaled, and no action is performed, step 74. If the recipe file is corrupted, errors also occur when readings the file, ending the read process with error step 74.

The read function specified in the line (R_Function) is called and executed to read the parameter value that is assigned to the corresponding parameter name, step 78. Then the name of the display function (D_Function) is read from the field in the R-DOM file for the line, and the display function is executed, step 75. The display function sends the parameter name and value from the read function to the visual recipe editor for display to the user. The user can view the parameter value in a customized format using the display function.

Processing then continues in the same way until the last parameter is reached, step 77. Once the last parameter (line) in the R-DOM and recipe files have been processed, step 76, reading and displaying is completed.

Figure 7:
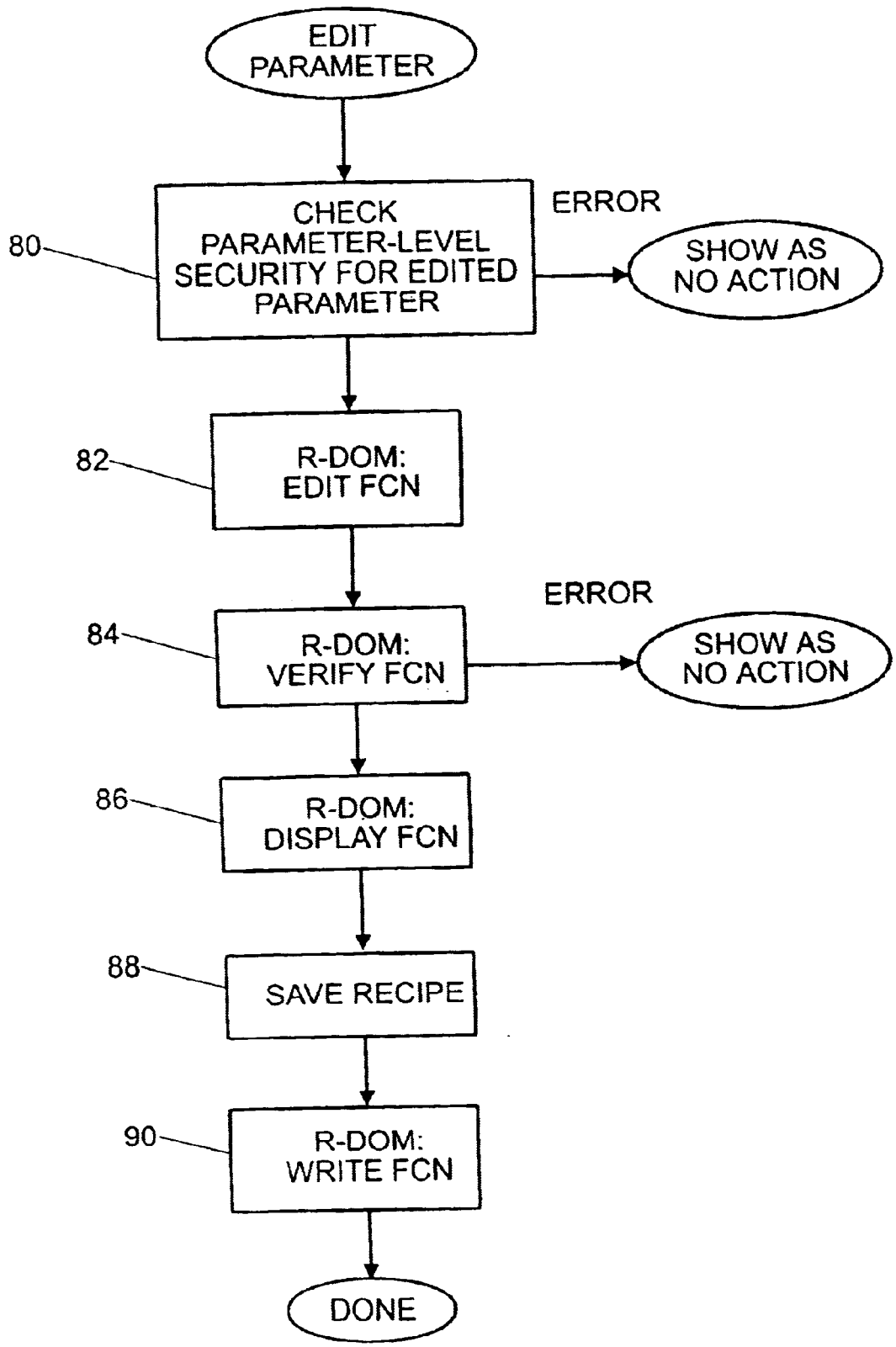
FIG. 7 is a flowchart for writing parameters to a recipe file by the visual recipe editor.

Editing Parameters FIG. 7

FIG. 7 is a flowchart for editing and writing parameters to a recipe file by the visual recipe editor. When a user of the visual recipe editor attempts to write or a parameter in a recipe file, the visual recipe editor executes the procedure of FIG. 7.

The parameter-level security is checked, step 80, by the VRE querying the security systems to check the current user's access level. A field of the parameter definition in R-DOM contains security information. If the user does not have the correct security access then an error occurs and no action is performed.

When the user belongs to the correct security group for the edited parameter, the edit function (E_Function) is called by VRE, step 82. The edit function allows the user to enter a new value for the parameter. A dialog box can be displayed on the screen, allowing the user to type in a new value, or a selection box with a list of choices may be displayed. When the user is running the visual recipe editor on a workstation inside the clean-room fab, a touch screen rather than a keyboard may be used. Then the edit function displays a keypad on the screen, allowing the user to press key buttons on the visual keypad.

Once the edit function receives a new parameter value from the user, the validation function is called, step 84. A field of the parameter definition in the R-DOM file contains security information. The validation function checks that the new parameter value falls between the minimum and maximum values specified for the parameter, and may perform other user-defined checks. If validation fails, then no action is taken and an error message displayed to the user.

All the actual functions have separate names. All the display functions start with D_, etc. In a R-DOM file one has an option to carry out the task of customization using five function types. These functions are of type Display, Write, Read, Validate, and Edit. There may be several functions of same type with a different name. The naming convention for the functions is as follows. The first letter defines the function type followed by an underscore (_) and then followed by actual function name. An example of one display function is D_Numberinput. A write function could be W_booleanonoff, a Read function could be R_booleanonoff, a Validation function could be V_minmaxtest, and an Edit function could be E_listcomoption.

Upon successful verification, the display function (D_Function) is called. The Display function is defined in a R-DOM field for every parameter. Execution of the display function, step 86, displays the values to the user of visual recipe editor.

The updated parameter is then saved to the recipe file, step 88. The write function (W_Function) for that parameter is called, step 90. The execution of the write function converts from display to raw format. The parameter is over-written with the updated parameter value. Other parameters in the recipe file are not altered. The writing process is then completed for the parameter. Other parameters can then be updated by the same process when the user attempts to edit a different parameter displayed by the visual recipe editor.

Figure 8:
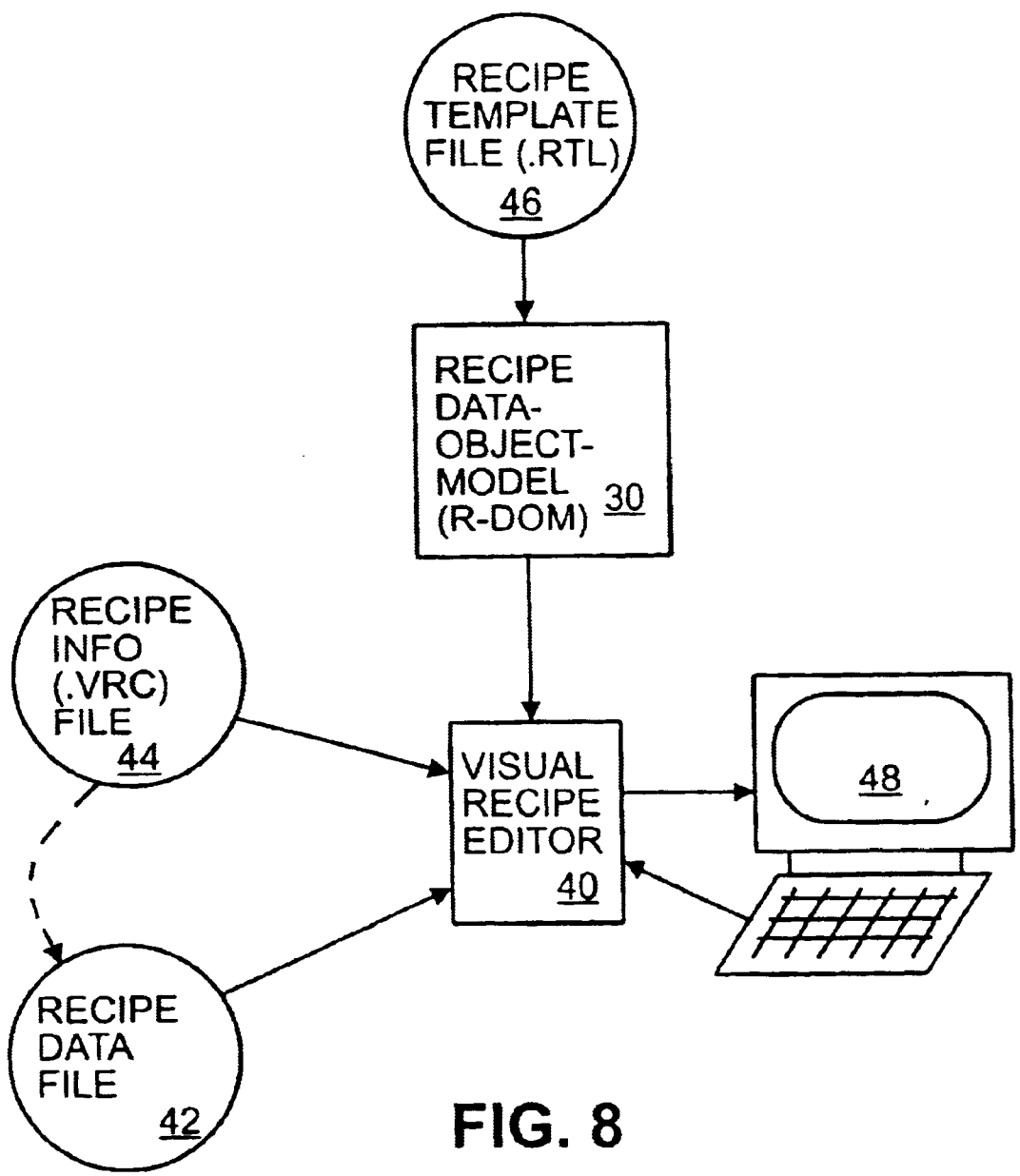
FIG. 8 shows the visual recipe editor reading a recipe using the associated R-DOM file.

R-DOM and Recipe Files FIG. 8

FIG. 8 shows the universal recipe editing system reading recipe and R-DOM files using a recipe information file (a VRC file). VRE 40 reads several files when opening a recipe. The recipe data file 42 contains only parameters values. Recipe data file 42 must be kept in its original file format so it can be read by the semiconductor-manufacturing equipment. Binary recipe files must be kept in the binary format, ASCII files must be kept in the ASCII format, etc. Rather than copy parameters to a different file, the parameters are directly read from and written to the recipe data file 42 by VRE 40. Since there is no change of format, the data is directly read from its original file. This saves processing time on the equipment and time as related to recipe editor. The overall performance is faster. This avoids the problem of stale data when using intermediate files.

When a user requests that a recipe data file be opened, VRE 40 first reads recipe information file 44. File 44 contains a list of each parameter in the order that it appears in both recipe data file 42 and in R-DOM file 46. Both the parameter number and name are included in the line of the recipe information file 44.

For example, recipe information file 42 may contain the lines:

```
0001: R-DOM Name
0002: Password
0003: Steps
0004: Recipe Name
0014: Recipe Description
0015: Creator
0016: Create Date/Time
0019: Etch Temp
0020: Sputter Temp1
0021: Sputter Temp2
0022: Sputter Temp3
0036: Etch Gas1
0044: PulseOn Time Sput1
```

In this example, these lines specify that the first 3 parameters in the R-DOM file are the R-DOM name, password, and the number of steps, all system parameters. The R-DOM name specified in the recipe information file is used by the visual recipe editor to open the correct R-DOM file. Recipe name, parameter 4, specifies the name of the recipe file. Creator name and date are also system parameters. These system parameters are not found in recipe data file 42 but only in the R-DOM file 46. Process parameters such as etch and sputter temperatures, etch gas and sputter time are also listed in the example. These parameters are found in both recipe data file 42 and R-DOM file 46. A typical file has many more parameters.

The parameters listed in recipe information file 44 are identified by visual recipe editor 40 when reading R-DOM file 46. The parameters are then extracted from recipe data file 42. Visual recipe editor 40 displays the parameters to the user on display 48.

Recipe information file 44 is used for bookkeeping information such as recipe creation and revision dates, and a history of revisions. All parameters are listed in recipe information file 44 in the same sequence order they appear in recipe data file 42, except that system and machine parameters do not appear in recipe data file 42, only in R-DOM file 46. The sequence listing of the parameters is used to create a map of parameters in recipe data file 44.

Parameters Shown in Visual Recipe Editor Display FIG. 9

FIG. 9 is a display screen that shows parameters from a recipe data file using the visual recipe editor's user interface. This is one of several different user interfaces for the visual recipe editor. This user interface is divided in to two parts: Header and Line. At the top of the screen, the header information for the recipe is shown. A header data item can only be defined once in a recipe data file. In a header field the user must input values that are true for the entire recipe. In contrast, line parameters can be defined once or more in a recipe data file. A line parameter is variable with each step. A step represents one operation such as drying, cleaning, grinding, etc. In the line parameter region a user defines the sequence of operations. The steps and parameter values are for a fictional plasma etch and sputter machine and are not actual values but used for illustration only.

The recipe name is NeoSputr M3B which indicates that the recipe is for a semiconductor-manufacturing equipment machine made by a company called NeoSputter. The recipe deposits a third metal layer on a wafer, and is the b revision of the process, so the recipe name includes the designation M3B. The creator of the recipe is Joe Engineer, who created it on Jan. 8, 1999. This recipe was later modified on Feb. 6, 1999 by Jim Mgr.

The recipe is for a fictional semiconductor-manufacturing machine made by a company called NeoSputter. The machine is a low-pressure or vacuum-chamber sputtering machine that directs an electron beam against one of several targets. The electron beam knocks atoms off the surface of the target and into the plasma. The atoms then travel through the vacuum chamber to one or more wafers. The atoms then stick to the surface of the wafer. Metal targets such as aluminum with various amounts of copper or silicon can thus deposit a metal layer on the wafer. Other targets can be selected to deposit a thin layer of refractive metal such as titanium or tungsten on top of the metal layer, or just before the metal layer is deposited. Thus the composition of the metal layers can be varied to form contacts to other layers with special properties.

The NeoSputter machine also can perform a plasma etch to clean the surface of the wafer and the targets before deposition. The temperature of the reaction chamber, the temperature of the targets, and a flow rate of a liquid that is fed into the vacuum chamber to form the plasma can be varied as line or process parameters. These process parameters are included in the recipe data file. The format of the recipe data file is determined by NeoSputter, who makes the machine. The process parameter data in the recipe data file causes the NeoSputter machine to vary the temperature, flow rate, and other parameters, and to end process steps after designated reaction times. This recipe includes 7 steps that are performed on each wafer or tray of wafers.

The process times are the parameter values in seconds. The first step is performed for 55 seconds. Then the second step is performed for 65 seconds. The third, fourth, and fifth steps are timed for 60, 60, and 90 seconds respectively. The sixth and final (seventh) step require 200 and 70 seconds. Thus the total process time for the wafer is about 10 minutes.

Once wafers are moved into the vacuum chamber by a robotic mechanism and the pressure reaches a level set by the machine, the first step is performed. The process temperature parameter sets the temperature in the vacuum chamber. This chamber temperature is initially set to 15 degrees centigrade, but then is raised to 105 degrees C. for step 5, and then lowered for steps 6 and 7.

The vacuum valve parameter turns a vacuum pump valve ON and OFF. When the vacuum valve parameter is ON, the chamber's pressure is pumped down toward a vacuum. The vacuum valve is turned OFF for steps 5 and 7, but is ON for the other steps. The vacuum is turned OFF for step 7 to allow the wafers to be moved out of the vacuum chamber and into an air-lock chamber during step 7. The vacuum valve is turned OFF for step 5 during a deposition step to allow the plasma pressure to rise somewhat, increasing deposition speed.

A chiller temperature parameter sets a temperature for the targets and substrate holding the wafer. A cooling system cools the target and wafer. The target's temperature rises when the electron beam strikes the target, so a cooling system is needed. Likewise, a reduced temperature for the wafer is useful to keep deposited atoms from re-entering the plasma. The chiller temperature is allowed to rise from 80 to 8 degrees C. over steps 1 to 4, but then the chilling is increased for steps 5 and 6 during the metal deposition when the e-beam heats the targets.

The liquid-1 flow rate increases from 1.5 to 3.1 cubic-centi-liters per second over steps 1 to 4, but then is reduced from steps 5 to 7. This liquid could be a reactive liquid such as $TiO_4$ that enters the plasma and changes the composition of the metal deposited. Thus the recipe first deposits a high concentration of Titanium on the wafer, and then reduces the Titanium as aluminum is deposited in step 5. This creates a titanium contact later below the aluminum metal layer, ensuring a better contact or creating a barrier metal.

The final parameter in the last row of the display is the target/beam recipe parameter. This parameter is a name of another recipe file that is called when the recipe file is executes by the NeoSputter semiconductor-manufacturing machine. This target/beam file contains a target selection and a power level for the electron beam, and possibly other parameters to control the beam. The recipe file MGR/R1 is selected for step 1, while the recipe file MGR/R2 is selected for steps 2, 3, and 4. This recipe could keep the beam off. Then recipe file MGR/R7 is executed for step 5, perhaps selecting the aluminum target and turning the electron beam on to a high power-level. In step 6, recipe file MGR/R0 is selected, which lowers the beam power and selects an aluminum-copper target, thus forming a copper layer at the top of the aluminum layer deposited in step 5. Finally the beam is turned off by file MGR/R9 during step 7.

The target/beam recipe parameter thus selects another recipe file for execution during each step. This allows for nested recipe files. A user can modify the recipe by selecting a parameter for any step with a mouse or keyboard and pushing an edit key. When a user edits a parameter value it follows the sequence of events in flowchart 6.

Advantages of the Invention

Some of the recipe-file formats do not include adequate documentation, such as full revision histories and fields for names of engineers making process changes. The visual recipe editor allows these other parameters such as revision histories to be kept even when the recipe data file format does not allow for it. Security is also important, since operators should not be able to change recipes. Even engineers in other groups should not be authorized to make recipe changes. Some recipe changes may require approval of the engineering or fab-production supervisor while other changes may be allowed. Critical parameters such as temperature should require a higher security level than less-important parameters such as furnace-tray push or pull times. The security system makes a distinction between editing rights given to a process engineer and those given to an operator. A process engineer is allowed to change parameter values over a large range. An operator is only given a smaller range to tweak process parameter values.

The access manager performs security checks when a file is opened or revised, and when individual process parameters are edited. Security information is included with each parameter in the R-DOM file, even though such security is not provided for by the recipe data file. Parameter-level security is provided along with security for the overall recipe.

The off-line recipe editor can be used in an office outside of the clean-room fab, as well as on terminals or workstations inside the fab. Recipes from many kinds of different semiconductor-manufacturing equipment machines, including recipes for different kinds and makes of machines can be edited by the same universal recipe editor. Recipe files having a variety of proprietary formats are edited using a single recipe editor. This allows users to learn a single user interface for all types of semiconductor-manufacturing equipment. Changes can be made to process conditions such as temperature, reactants, gas flows and pressures, reactions and delay times, and plasma or ion-beam energies, with tighter process-control limits compared to the ones provided by semiconductor manufacturing equipment.

The invention provides for customization and generalization. The flexibility of the R-DOM architecture provides visual recipe users with a mechanism to create customized functionality in addition to standard functions provided by the equipment's online recipe editor. With R-DOM the user has the flexibility to write customized functions using the functions that are built in to R-DOM.

Generalization is also provided. The flexible architecture of the VRE application and R-DOM allows the user to incorporate additional functionality. By doing so this application can be used not only in semiconductor manufacturing but also in other process industries like disk drive manufacturing, flat panel display, pharmaceutical processing, food processing, etc.

Alternate Embodiments

Several other embodiments are contemplated by the inventors. For example the R-DOM file can use different formats, and parameters can occupy several lines in the R-DOM file or several parameters can share the same line. Formats include ASCII formats, including comma-separated value (CSV), comma-separated name-value pair (CSNVP), extensible-markup language (XML) and a wide variety of custom formats. Not all fields on a parameter's line need to be explicitly specified. Default values for edit and read functions can be used. A different naming convention can be used for these functions. Since process recipes are some of the most closely-guarded secrets in the semiconductor industry, the examples described herein are fictional and do not show actual process conditions. The actual process parameters and conditions can easily be substituted into the recipes by process engineers.

The recipe information file and R-DOM files can be combined into a single file, or can be divided into more files. Rather than use object-orientated programming techniques, other programming techniques can be used to implement the functions performed by the visual recipe editor. Parts of the editor can be standard modules such as Microsoft Windows, Office or Unix functions and can be shared with other applications. Many different programming languages can be used.

Recipe storage may be a local hard disk, or may include access to a distributed file system such as a local-area network (LAN). In the case of a LAN, the recipes can be located on many different semiconductor-manufacturing machines that are connected to the LAN, as well as workstations in the fab and office computers such as PCs, also Manufacturing Execution Systems (MES), Recipe Management Systems (RMS), and Enterprise Resource Planning systems.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A semiconductor-process recipe editor comprising:
    a data-presentation component having access to recipe data files, the recipe data files specifying process parameters including temperature, process time, flow rates, and power levels for fabrication equipment that form electrical circuits onto semiconductor wafers, the recipe data files computer-readable by the fabrication equipment;
    wherein the recipe data files are in various formats, each format specific to a specific process step performed by a piece of fabrication equipment;

a display component for generating a visual display of values of the process parameters to a user;

a behavioral component coupled to the data-presentation component, including:

file-validator means for validating access to a recipe data file by a user;

parameter-read means for reading a process parameter from the recipe data file at a location determined by a recipe data object model (R-DOM) file specific to the piece of fabrication equipment controlled by the recipe data file;

parameter-display means, coupled to the parameter-read means to receive a process parameter from the parameter-read means, for sending the process parameter to the display component for display to the user;

parameter-security means, activated when user requests to modify a selected process parameter, for reading a security indicator for the selected process parameter from the R-DOM file, the security indicator indicating when user has a security level sufficient to modify the selected process parameter, wherein the user is prevented from modifying the selected process parameter when the security indicator indicates that the user does not have sufficient security to modify the selected process parameter;

parameter-edit means, activated when the parameter-security means clears the user to modify the selected process parameter, for displaying a dialog box on the display component, the dialog box allowing the user to select a new value for the selected process parameter;

parameter-verify means, activated by the parameter-edit means when the user selects a new value, for validating that the new value is valid for the selected process parameter by comparing the new value to limits of the selected process parameter, and displaying an error when the new value is not valid; and parameter-write means, receiving the new value, for over-writing and existing value of the selected process parameter in the recipe data file with the new value at a location determined by the R-DOM file specific to the piece of fabrication equipment controlled by the recipe data file;

whereby the recipe data file is directly written with new values of process parameters using the R-DOM file to determine the location of parameters in the recipe data file.

2. The semiconductor-process recipe editor of claim 1 wherein the R-DOM file further comprises:

a sequence of process parameters indicating locations of the process parameters in recipe data file; and system parameters that are not present in the recipe data file, the system parameters being stored in the R-DOM file but not in the recipe data file, whereby additional parameters are stored in the R-DOM file that are not in the recipe data file.

3. The semiconductor-process recipe editor of claim 2 further comprising:

an recipe information file containing a list of parameters in R-DOM file and in the recipe data file, the index file including a pointer to the recipe data file and a pointer to the R-DOM file.

* * * * *